March 25, 1969
H. M. CROW
3,434,452
WATER BORNE VEHICLE
Filed June 1, 1967
Sheet 2 of 2
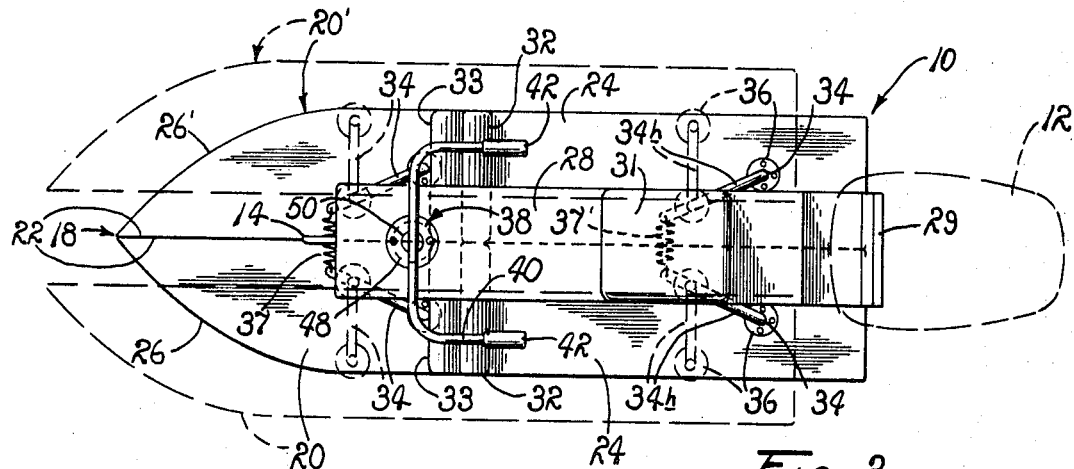
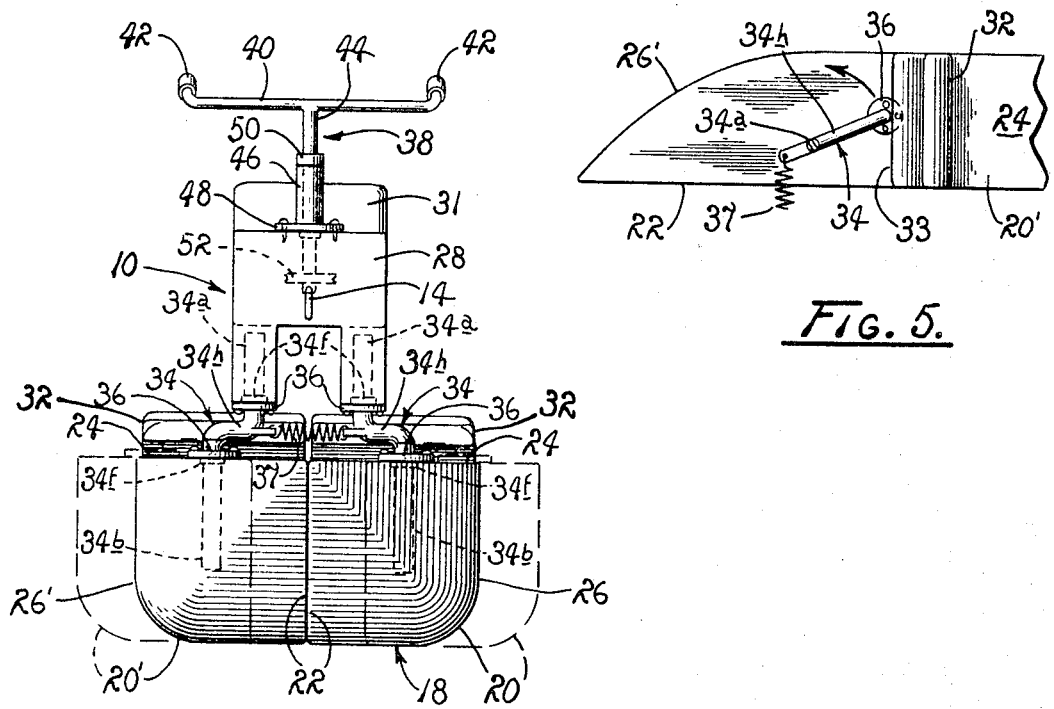
HOWARD M. CROW
INVENTOR
Huebner & Worrel
ATTORNEYS

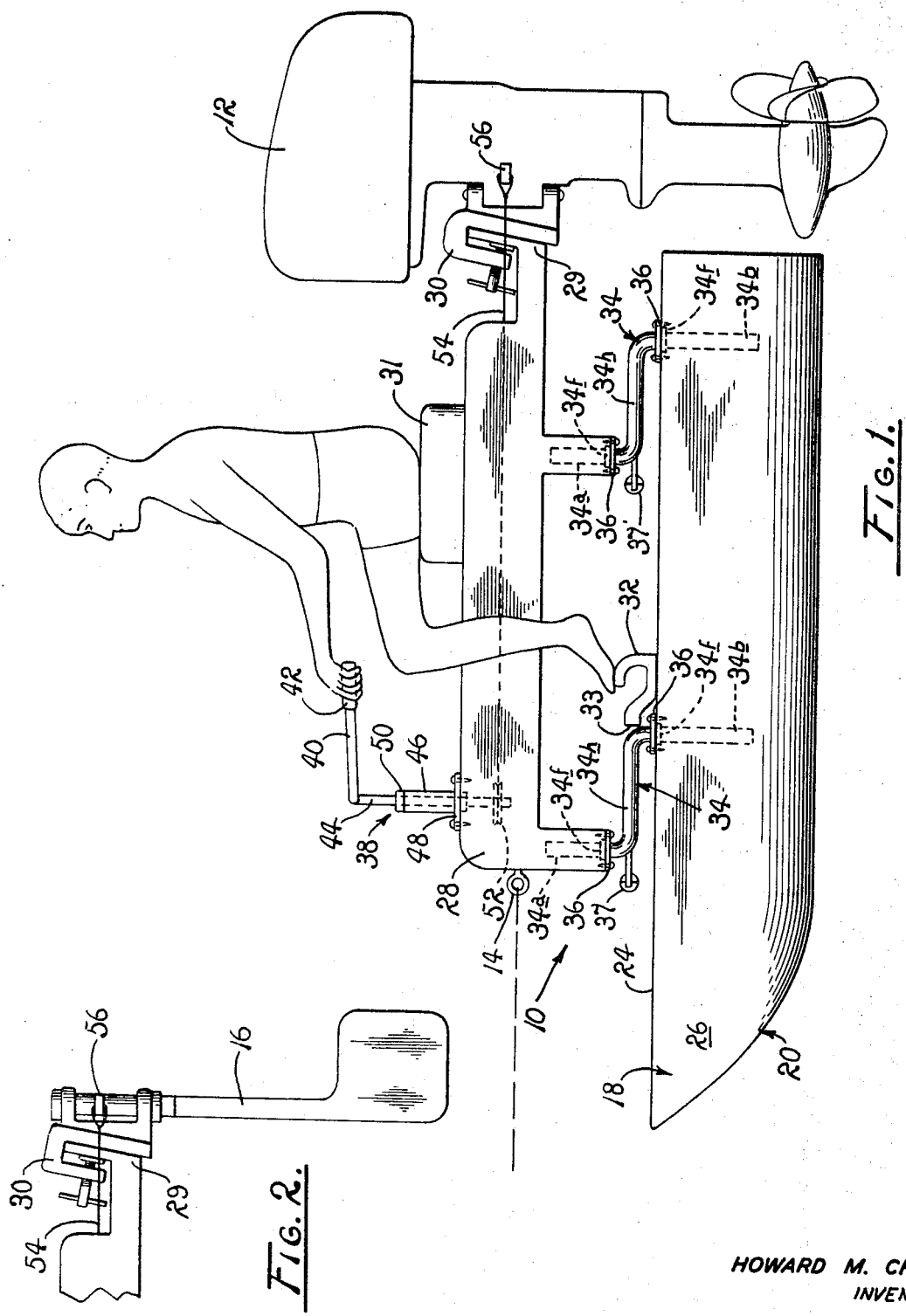

United States Patent Office 3,434,452
Patented Mar. 25, 1969

3,434,452
WATER BORNE VEHICLE
Howard M. Crow, P.O. Box C,
Three Rivers, Calif. 93271
Filed June 1, 1967, Ser. No. 642,879
Int. Cl. B63h 25/50
U.S. Cl. 115—70                    9 Claims

ABSTRACT OF THE DISCLOSURE

A steerable water borne sporting vehicle adapted to be towed, or propelled by an outboard motor, and having a pair of separable hull halves or semi-hulls connected by parallel linkage to a rider support frame, the semi-hulls being normally spaced apart for providing a relatively stable "at rest" position in the water and movable toward each other, generally horizontally, incident to being propelled through the water, to a substantially closed position in which the semi-hulls simulate a complete hull. Upon deceleration, the semi-hulls assume the spaced apart position.

---

This application is related to U.S. Patent No. 3,323,483, dated June 6, 1967, for "Water Borne Vehicle" and is directed to improvements over the vehicle described and claimed in the patent.

Background of the invention

The present invention relates to a water borne vehicle adapted to be propelled upon the surface of a body of water and more particularly to such a vehicle which provides a relatively stable "at rest" position in the water for dependably supporting a rider thereon and is automatically adjusted for relatively high speed operation while providing maximum maneuverability incident to being propelled through the water.

Conventional water borne sporting vehicles such as water skis, surfboards and the like require that the persons using the vehicles have appreciable athletic ability. In order to achieve any degree of proficiency on such vehicles, the user is required to spend many hours practicing and usually must first obtain expert instruction before even attempting their use. Such vehicles present a minimum of surface contact with the water in order to provide maximum maneuverability at high speeds and are consequently less stable at relatively slow speeds. In this respect, water skis are particularly unstable and entirely incapable of supporting a person thereon in the normal standing position when the skis are at rest in the water. Furthermore, such conventional vehicles require the user be disposed in such standing position during high speed maneuvering.

The water borne vehicle disclosed in the aforementioned patent overcomes many of the disadvantages of the prior art sporting vehicles. However, the vehicle of the patent, as designed, requires hull sections of a somewhat costly hydrodynamic design and a somewhat complex structure interconnecting the hull sections which, in operation, changes the elevational position of the operator and the center of gravity of the vehicle.

Summary of the invention

Accordingly, it is an object of the present invention to provide an improved water borne vehicle, which not only has improved stability as compared with existing water borne vehicles during relatively slow speed operation and when at rest in the water and is capable of being operated by relatively inexperienced persons without appreciable athletic ability, but also is simple in construction and reliable in operation.

Another object is to provide a water borne vehicle of the character described which affords a more efficient use of natural forces, hydraulic and mechanical, in the movement of the hull sections, thus eliminating the need for a more costly hydrodynamic design thereof, with attendant economical savings in the production of the vehicle.

A further object is to provide an improved water borne vehicle which is capable of supporting a person in a sitting position at a substantially constant elevation under all speed conditions and even when the vehicle is at rest in the water with substantially no change in the position of the center of gravity of the vehicle.

The present invention contemplates a water borne vehicle in which a pair of complementary semi-hull sections are interconnected by parallel linkage so that in an "at rest" position they are laterally spaced and in a high speed maneuvering or planing position they are in engagement and simulate a conventional hull, movement between the positions being accomplished while providing maximum stability and maintaining an operator at substantially the same elevation above the water throughout the entire range of operational speeds of the vehicle.

Other objects, advantages and features of the present invention will subsequently become more clearly apparent upon reference to the following description in the specification and accompanying drawings.

Brief description of the drawings

FIG. 1 is a side elevation of an improved water borne vehicle embodying the principles of the present invention showing a forwardly disposed towing connection and an opposite rearwardly extended bracket for mounting an outboard motor;

FIG. 2 is a fragmentary side elevation of the rear portion of the vehicle of FIG. 1 illustrating the attachment of a rudder in place of the motor when the vehicle is being towed;

FIG. 3 is a top plan view of the improved water borne vehicle having a longitudinally split hull showing a high speed planing or maneuvering position thereof in full lines, with an "at rest" position in dashed lines in which the half sections of the hull are separated;

FIG. 4 is a front elevation of the water borne vehicle shown in FIG. 3; and

FIG. 5 is a fragmentary plan view of the forward end of one of the semi-hull sections illustrating the swinging of the linkage in the movement of the section to its separated position.

Description of the preferred embodiment

Referring more particularly to the drawings, there is shown in FIG. 1 a water borne vehicle 10 embodying the principles of the present invention which is adapted to be propelled through a body of water in a predetermined forward direction of travel by means of an outboard motor 12 or a tow line connected to a ring 14. In the case of the latter form of propulsion, the motor is replaced with a rudder 16, see FIG. 2.

Directing attention also to FIGS. 3 and 4, it will be noted that vehicle 10 has an elongated hull 18 which is made up of a pair of buoyant, complementary halves or semi-hull sections 20, 20', each section being formed with a substantially flat inner mating surface 22 and a substantially flat upper surface 24. The hull sections further include outer contoured surfaces 26, 26' which are of simple conventional hydrodynamic design and are symmetrical with respect to a generally vertical plane defined by surfaces 22 when in engagement. The hull sections are construction of a lightweight buoyant solid material or may be of hollow construction and filled with a suitable foam plastic or the like for maintaining the buoyancy of the sections.

Mounted on the semi-hulls 20, 20', by linkage hereinafter described, is a chassis or support frame 28 having a bracket 29 for mounting motor 12 or rudder 16, as desired, by a clamping bracket 30. The frame is also adapted to carry a rider or operator for which purpose the frame has a saddle or seat 31 and there are footrests 32 on the semi-hulls, the seat being adjustable to insure that the operator can rest his feet on the footrests. The footrests include forwardly disposed stop surfaces 3.

As best seen in FIGS. 1 and 4, support frame 28 is connected to the semi-hulls 20, 20' by linkage in the form of a plurality of cranks 34, each having parallel, oppositely directed shaft ends 34a, 34b joined by a substantially horizontal portion 34h, the shaft ends being suitably journaled in the frame and the semi-hulls, respectively. Each shaft end may be provided with a shoulder or flange 34f engaged by a washer 36 suitably secured, as by screws or the like, for holding the shaft end in the frame or one of the semi-hulls, as the case may be. Viewing FIG. 3, it is to be noted that cranks 34 are so connected that portions 34h thereof at one side of the frame are arranged in parallelism, the same being true of the portions 34h on the other side of the frame, and that the portions 34h swing in a substantially horizontal plane, thus achieving a double parallelogram effect. Although only one pair of cranks is shown at each side of the frame, it will be appreciated that more could be employed, if deemed necessary, so long as they are arranged parallel to the others. Also, the cranks have associated therewith suitable means for biasing them, see FIG. 5, so that the semi-hulls are urged to their spaced or separated positions, as indicated in dashed lines in FIGS. 3 and 4, for reasons later appearing. Farther separation of the semi-hulls is prevented by engagement of the stop surfaces 33 of the footrests 32 against the horizontal portion 34h of the cranks. The biasing means for positive separation of the semi-hulls could take the form of torsion springs, not shown, one about each of shaft ends 34a (or one about each of shaft ends 34b). Alternatively, springs or other biasing means could be connected externally to the cranks, as shown schematically at 37 in FIG. 3.

Disposed at the forward end of frame 28 is a steering mechanism 38 including a handle bar 40 having hand grips 42 and a centrally depending control rod or shaft 44. The control rod has the intermediate portion thereof journaled in a bearing sleeve 46 having a flanged portion 48 suitably secured to frame 28, as by screws or the like. A collar 50 is pinned to the control rod immediately above the bearing sleeve 46 to preclude relative downward movement of the rod with respect to the sleeve. Mounted on the lower end of the control rod is a pulley 52 which has a chain or control cable 54 trained thereabout, the ends of the cable being suitably attached to the sides of motor 12 (FIG. 1) or rudder 16 (FIG. 2), as at 56, to effect desired steering of the vehicle by proper manipulation of the handle bar 40.

*Operation*

The operation of the described embodiment of the subject invention is believed to be clearly apparent and is briefly summarized at this point. With the water borne vehicle of the present invention disposed in its static or "at rest" condition in the water, the hull sections or semi-hulls 20, 20' are disposed in their widely separated positions, as shown in dashed lines in FIGS. 3 and 4, for maximum stability of the vehicle. Accordingly, the vehicle is capable of supporting a person on the seat 31 with substantially no chance of the vehicle overturning or tipping to any position which might endanger the rider. The seat may be adjusted longitudinally of frame or chassis 28 to insure that the rider, irrespective of size, can easily reach the hand grips 42 on the handle bar 40 and that his feet can be rested upon the footrests 32. It is further noted that the stop surfaces 33 of the footrests are disposed against their respective horizontal portions 34h of the cranks 34 to limit any further lateral outward separation of the semi-hulls.

Upon propulsion of the water borne vehicle through the water, either by a tow line connected to ring 14 or the outboard motor 12, the hull sections or semi-hulls 20, 20' begin immediately to move laterally inwardly toward their retracted planing or maneuvering position of FIGS. 1, 3 and 4. Such movement is effected by the reaction of the water flowing against and along the pointed bow ends of the semi-hulls and along their outer contoured surfaces 26, 26' which has a greater surface area than the inner flat surfaces 22. Such inward movement of the hull sections continues in direct proportion to the increase in vehicle speed so as to provide maximum stability at all operational speeds of the vehicle. Accordingly, as the speed of the vehicle increases, the hull sections move closer together until the surfaces 22 of the hull sections are in engagement and the vehicle presents an ever-decreasing amount of drag or resistance as it is propelled through the water. During such inward movement of the semi-hulls, the tension on any biasing means associated with cranks 34 is correspondingly increased to provide an opposite force tending to urge the hull sections apart immediately upon any decrease in the speed of the vehicle so as always to maintain maximum stability. However, in the improved water borne vehicle of the present invention, the biasing means may be unnecessary since the natural forces, inertia, drag, water entering between the surfaces 22, etc., all combine to opening of the semi-hulls upon deceleration. For example, during acceleration of the motor 12 the frame 28 is thrust forwardly releative to the semi-hulls 20 and 20' which are somewhat constrained or concurrently forced relatively rearwardly in lagging relation to the frame by the resistance of the water to their forward movement. Such relative movement between the frame and the semi-hulls continues until the semi-hulls reach their fully closed planing position. Conversely, when decelerated the motor imposes a substantial drag upon the vehicle which pulls the frame rearwardly relative to the semi-hulls so as automatically to force them apart a distance directly proportional to the speed of the vehicle for maximum stability during slow-speed operation. Nevertheless, it is preferred that the biasing means be employed for positive separation of the semi-hulls upon such deceleration of the vehicle.

It is noted that the rudder 16 (or the propeller of motor 12) is maintained at a constant depth within the water immediately below and behind the hull 18. Accordingly, the operator has maximum steering control in all operating conditions and speeds of the vehicle for maneuvering the vehicle by manipulation of the steering mechanism 38 in the usual manner. Moreover, because of the parallelogram effect, the semi-hulls essentially move straight out from each other on the surface of the water with substantially no change in the position of the center gravity of the vehicle and maintenance of the operator at a substantially constant elevation.

In view of the foregoing, it is readily apparent that the structure of the present invention provides a water borne vehicle having greatly improved stability over existing water borne vehicles particularly during slow speed operation and when the vehicle is disposed in a static or "at rest" position in the water without impairing its maneuverability during high speed operation. This highly stable structure is capable of supporting a rider in a comfortable sitting position under all operating conditions without requiring any balancing effort so that the vehicle can be used by even the most inexperienced riders, irrespective of their athletic ability.

Having described my invention, what I claim as new and desired to secure by Letters Patent is:

1. A water borne vehicle comprising a pair of separable flotation members; and means interconnecting said flotation members for generally horizontal movement relative to each other between a substantially separated position and a substantially closed position, said means including linkage arranged for swinging in a generally horizontal plane; said flotation members being responsive to water resistance during travel for automatically moving the flotation members toward said closed position incident to increased speed of travel and toward said separated position incident to decreased speed of travel.

2. The water borne vehicle of claim 1 wherein said linkage comprises parallel links arranged for swinging in a generally horizontal plane.

3. The water borne vehicle of claim 2 wherein said parallel links are symmetrically arranged with respect to a generally vertical plane to provide a double parallelogram effect.

4. The water borne vehicle of claim 1 wherein said means further includes a rider support frame, and the linkage provides for maintaining the frame in a substantially constant attitude.

5. The water borne vehicle of claim 1 wherein said linkage includes cranks, each having shaft ends journaled in said frame and flotation members, respectively.

6. A water borne vehicle adapted to be propelled through the water in a predetermined forward direction of travel comprising a rider support frame; a pair of separable buoyant hull members having opposite outer contoured surfaces; and linkage means connecting said hull members to the frame for generally horizontal, simultaneous lateral swinging movement between a relatively separated position and a relatively retracted water planing position, said linkage means providing for maintaining the frame at a substantially constant elevation, and biasing means connected to said linkage means urging said hull members toward their separate position, said biasing means being tensioned by said movement of the hull members to their retracted water planing position incident to the force of water acting against said outer contoured surfaces of the hull members during propulsion of the vehicle in said predetermined forward direction of travel through the water and being effective automatically to return the hull members toward their separated position upon deceleration of the vehicle.

7. The water borne vehicle of claim 6 wherein:
each of said hull members is a semi-hull which when together in said retracted water planing position simulate a complete hull; and
said outer contoured surfaces are of a simple hydrodynamic design.

8. The water borne vehicle of claim 6 wherein:
said linkage means comprises a plurality of parallel links symmetrically disposed with respect to a centrally located, generally vertical plane for providing a double parallelogram arrangement.

9. The water borne vehicle of claim 6 wherein:
said rider support frame has means for attaching a steerable device thereto, and
a steering mechanism connectable to said device for steering the same.

References Cited

UNITED STATES PATENTS 3,323,483 6/1967 Crow.
3,373,715 3/1968 Stacey _____ 115—70

TRYGVE M. BLIX, *Primary Examiner.*